Dec. 19, 1967     E. D. HAUK     3,358,497
ARRANGEMENT FOR INSPECTING OR TREATING TUBULAR MEMBERS
Filed Jan. 10, 1966

INVENTOR.
ERNEST D. HAUK
BY
Janowitz & Carr
ATTORNEYS.

United States Patent Office 3,358,497
Patented Dec. 19, 1967

3,358,497
ARRANGEMENT FOR INSPECTING OR TREATING TUBULAR MEMBERS
Ernest D. Hauk, 1315 E. 23rd St., Signal Hill, Calif. 90806
Filed Jan. 10, 1966, Ser. No. 519,624
6 Claims. (Cl. 73—49.1)

ABSTRACT OF THE DISCLOSURE

An inspecting device for a tubular member or the like including a cylinder adapted to receive the tubular member and provided with spaced annular seals for defining an enclosed chamber around the tubular member adapted to receive fluid which may be under pressure, the seals being hollow members which converge inwardly from their ends to narrower throats, which may include openings through the walls thereof communicating with the chamber.

---

This invention pertains to an arrangement for retaining fluid adjacent the surface of a tubular member in the testing or treating of such a member, and in particular to a device for use with well pipe.

The device of this invention can be adapted for various purposes such as used as a slit finder through the detection of a pressure variation on the exterior of a pipe. As such, it will apply pressurized fluid to the exterior of the pipe, and by a loss in pressure will show the presence of a split or hole through the wall of the pipe. Other examples of the use of the invention are as a means for treating a pipe with a heated fluid such as steam, or for inspecting pipe through ultrasonic testing to determine wall thickness and to detect flaws.

The device includes a cylindrical member adapted to receive the pipe or other tubular element at its axis. An annular seal is provided at the bottom and, when it is to retain a pressurized fluid, a second annular seal is provided at the top of the cylindrical member. This defines a chamber around the surface of the pipe. A fluid inlet is connected to this chamber to admit fluid to the periphery of the pipe within the chamber This may be a pressurized fluid, such as air or steam. The seals are hollow members convergent inwardly from their ends to narrower throat portions which bear against the periphery of the pipe. Where pressures are involved, the seals have openings therethrough which connect between the fluid chamber and the interiors of the seals. As a result of this construction, the seals effectively retain the fluid within the chamber despite unevenness of the surface of the pipe. In use, the pipe is advanced through the chamber in a testing or treating operation. but the fluid will not escape from the chamber except where there is an opening through the wall of the pipe to allow its escape inwardly. In fact, the usual collars on the pipe, even though they constitute abrupt enlargements, will pass through the chamber without leakage of the fluid. They merely deflect the seals as they pass, and a continuous fluid-tight engagement is maintained.

The resistance to pipe movement is low, so that the pipe may be readily advanced through the chamber as it is being tested or treated. The hollow construction of the seal, with its wall converging toward the throat, means that the low friction engagement with the pipe is maintained even when pressure within the chamber is increased. The forces urging the periphery of the throat portion of the seal against the pipe as pressure increases will be substantially balanced by forces pulling this portion of the seal away from the pipe surface. The result is a relatively unchanging frictional force on the pipe.

An object of this invention is to provide an improved means for retaining a fluid adjacent the surface of a tubular member.

Another object of this invention is to provide a fluid sealing arrangement that will accommodate irregularities in the surface of a pipe received thereby.

A further object of this invention is to provide a means for retaining a fluid against a pipe to be moved through a chamber, which will seal against leakage even where there is a variation in pipe diameter, such as where the pipe has outwardly extending collar portions at spaced intervals.

A still further object of this invention is to provide an improved means for detecting flaws or openings in a pipe's surface.

An additional object of this invention is to provide an annular seal that will maintain a fluid-tight relationship with a cylindrical member received within it, and which will maintain a substantially constant resisting force on the member under varying pressures.

These and other objects will become apparent from the following detailed description taken in connection with the accompanying drawing in which.

Figure 1:
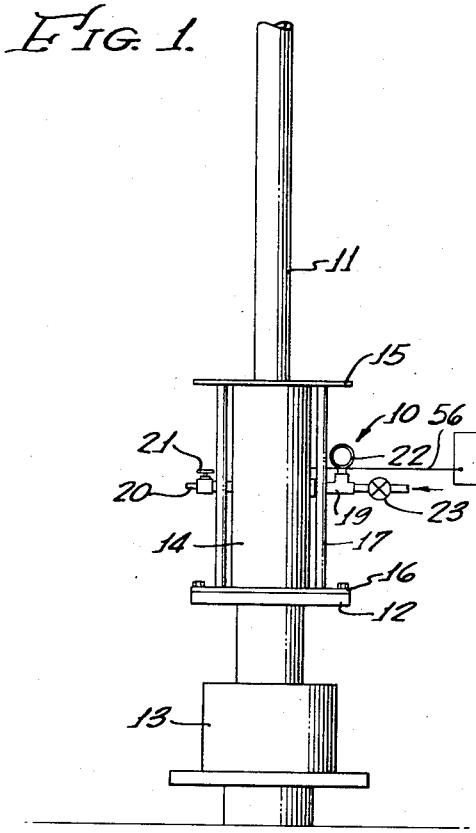
FIGURE 1 is an elevational view of the device of this invention employed as a split finder for a pipe that is advanced through it.

As shown in the drawing, the device 10 of this invention is shown as employed as a slit finder to detect any openings through the wall of the tubing 11. Typically, the device 10 is mounted on a flange 12 above a mechanism 13 for moving the pipe 11 upwardly from a well beneath it. Thus, the device 10 remains stationary while the pipe 11 is advanced axially through it.

The slit finder 10 includes a cylindrical member 14, somewhat larger than the diameter of the pipe 11 and provided with outwardly extending radial flanges 15 and 16 at its upper and lower ends, respectively. Reinforcing rods 17 extend between the flanges 15 and 16 exteriorly of the cylindrical portion 14. A fluid inlet 19 is provided in the central circumferential portion of the member 14 by which a pressurized fluid may be introduced into the member 14. An outlet 20 also is provided in the wall of the member 14, this being controlled by a valve 21. A pressure gauge 22 is included at the inlet 19, so that the pressure of the fluid within the chamber may be detected. The inlet line may be closed by a valve 23.

Figure 2:
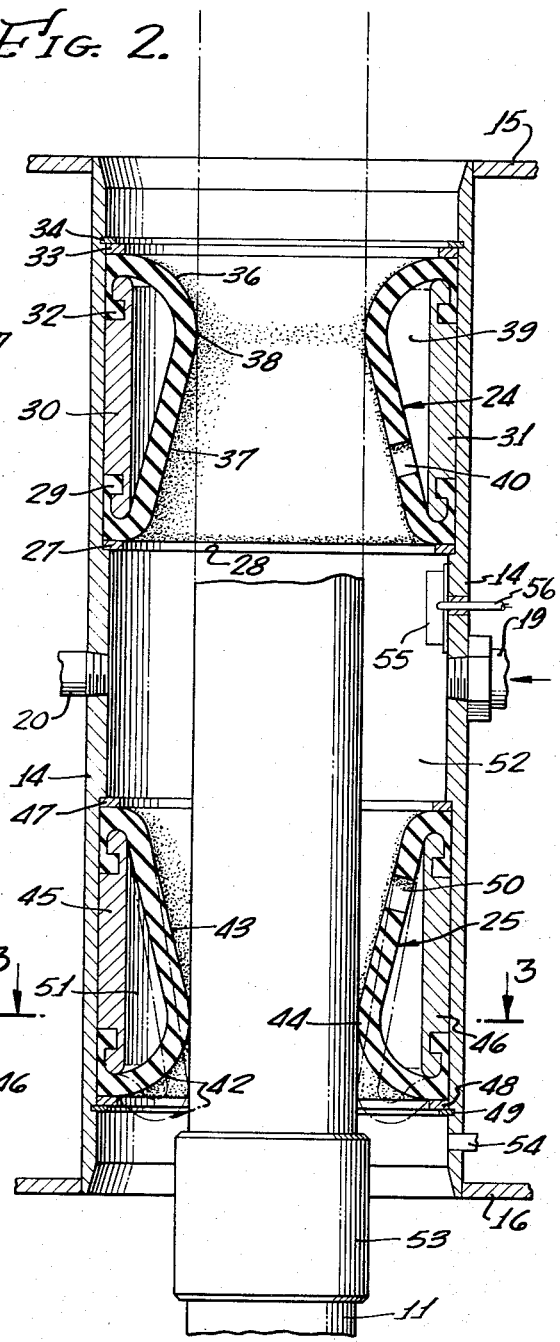
FIGURE 2 is an enlarged longitudinal sectional view through the pressure chamber of the device of FIGURE 1.
Figure 3:
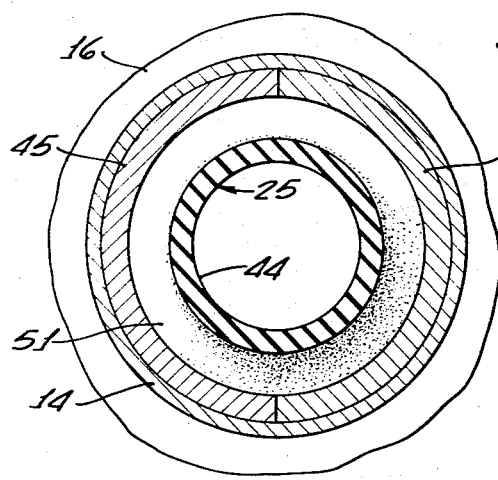
FIGURE 3 is a transverse sectional view taken along line 3—3 of FIGURE 2.

As best seen in FIGURE 2, inside the cylindrical member 14 at its top and bottom ends are annular seals 24 and 25. These are of flexible sheet material, normally being of an elastomer, such as rubber. Flexible strengthening elements, such as cords, may be included within the walls of the sealing members.

The upper seal 24 extends downwardly to a retainer ring 27 that bears against a shoulder 28 on the inner circumferential wall of the cylindrical member 14. Above this, the lower end of the seal 24 includes a bead 29 retained by two semicylindrical members 30 and 31 that together bear against and extend the full circumference of the inner wall of the member 14. The lower ends of the members 30 and 31 are recessed to receive the bead 29, while the upper ends are similarly recessed to receive a bead 32 at the upper end of the sealing member 24. These semicylindrical members 30 and 31, therefore, provide a split annular sleeve that holds the ends of the elastomeric sealing element against the inner periphery of the cylindrical member 14.

At its top end, the sealing member 24 engages a ring 33 held in place by a snap ring 34 that fits into an annular recess in the wall of the member 14. The two rings 27 and 33 thereby provide shoulders that secure the seal assembly axially relative to the outer member 14.

The member 24 is longer than the space between the rings 27 and 33, having a rounded upper end 36 and a more shallowly inclined lower portion 37 that converge at a throat 38. As a result, the member 24, together with the elements 30 and 31, defines a chamber 39. An opening 40 is provided in the wall of the member 24 below the throat 38.

The lower seal 25 is identical to the upper seal, but is reversed in position. In other words, the rounded lower portion 42 of the member 25 meets the inclined upper portion 43 at a throat 44. Semicylindrical members 45 and 46 hold the beads at the ends of the member 25, which are retained against axial movement by rings 47 and 48. The latter is held in place by a snap ring 49. The opening 50 through the portion 43 of the member 25 is above the throat 44, providing communication from the exterior to the space 51 within the seal 25 between it and the semicylindrical members 45 and 46.

The throats 38 and 44 of the seals 24 and 25 are made slightly smaller in diameter than the outside diameter of the tube to be extended through the device 10. A satisfactory result is obtained if the throat diameter is 2.125 where the outside diameter of the pipe 11 is 2.375. For other sizes of pipe, the same ratio of throat diameter to pipe diameter may be maintained.

As a result of this construction, when the pipe 11 is received within the device 10, the seals 24 and 25 will be deflected outwardly slightly. However, these hollow flexible members will not exert a large force against the surface of the pipe, so that the frictional resistance to movement of the pipe is not great.

In use of the device 10, the pipe 11 extends axially into the unit 10, as illustrated. With the outlet valve 21 closed, pressurized fluid is introduced through the inlet 19 into the chamber 52 between the seals 24 and 25 and exteriorly of the periphery of the pipe. With the valve 23 then closed, the pressure will be retained around the pipe 11. Generally, the pressure is kept at around 10 to 15 p.s.i. gauge, although higher pressures can be used. This pressure is detected on the gauge 22, so that it can be known that the chamber 52 is under the desired amount of pressure.

The pipe 11 then is advanced upwardly by the mechanism 13, so that it moves axially through the testing device 10. As long as the periphery of the pipe 11 is continuous, the pressure within the chamber 52 will be unchanged. However, in the event that there is a slit or opening through the wall of the pipe 11, it will provide egress for the fluid in the chamber 52 to the interior of the pipe 11, and the pressure will drop. Consequently, by observing the gauge 22, it can be determined when a flaw in the pipe has been reached, so that the hole through the wall of the pipe and its location will have been determined. This enables it to be marked and repaired. Of course, when the testing is complete, the valve 21 can be opened to allow the fluid in the chamber 52 to escape, and the test device 10 then is disassembled from the pipe 11.

The construction of the seals 24 and 25 not only results in low frictional engagement as the pipe first is introduced into the cylindrical member 14, but this frictional force remains substantially constant after the chamber 52 is pressurized and even in the event that the pressure within the chamber 52 is varied. The openings 40 and 50 allow the pressure from the chamber 52 to exist also in the spaces 39 and 51 within the two seals. This pressure reacts outwardly on the inclined wall portions 37 and 43, as well as the throats 38 and 44, tending, therefore, to force the seal tighter against the surface of the pipe. On the other hand, the pressure reacts also on the interior of the end portions 36 and 42, which tends to stretch the seals outwardly and to pull them away from the surface of the pipe. The distended position of the seal 25 under higher pressures is indicated in phantom in the lower portion of FIGURE 2. As a result, the force pulling the seal away from the surface of the pipe substantially balances the force urging it into contact with the periphery of the pipe, so that the grip of the seal on the pipe remains essentially unchanged. Thus, the pipe 11 can be advanced axially through the unit 10 without meeting excessive resistance even when the unit is under relatively high pressures.

Virtually a perfect seal is obtained by the members 24 and 25, regardless of irregularities in the surface of the pipe and even where collars on the pipe are moved through the unit. At spaced intervals on a well pipe there are flanges such as the collar 53 seen in FIGURE 2, which project outwardly beyond the circumference of the pipe, providing flat radial shoulders. Generally, these will be about ½ inch greater in diameter than the pipe 11 but, of course, are smaller in diameter than the interior of the member 14. These collars will pass through the seals 24 and 25 without loss of fluid or pressure and without damage to the seals or undue resistance to the movement of the pipe. As the flange 53 is advanced upwardly, therefore, it merely deflects the seal 25 outwardly, which still keeps continuous contact and does not allow the fluid within the chamber 52 to escape. The seal 25 closes in immediately behind the collar 53, so that again the pressure is retained. A similar effect is obtained at the upper end of the unit as the collar 53 passes the seal 24. The inclined walls 42 and 43 of the seal 25 and the inclined walls 37 and 36 of the seal 24 help the collar to move through easily without tending to catch on the seals and to tear them loose. They provide a tapered lead opening for the collar as well as an exit for it when it leaves the throat area. This gives a smooth transition from the normal diameter to the flanged portion of the collar 53.

When the device is used in conjunction with ultrasonic inspection, a transducer will be included in the zone of the chamber 52, and the unit 10 will be rotated to permit a scanning of the surface of the pipe. This permits tests for wall thickness of the pipe 11 and also permits flaws in the pipe to be detected. In this arrangement, the fluid in the chamber 52 need not be under pressure. Consequently, it is possible to omit the upper seal 24, retaining the fluid merely by the lower seal 25. However, it may be preferred to provide a closure for the chamber in the form of the upper seal 24 for protecting the fluid within it. Also, the upper seal will wipe the surface of the pipe, cleaning it so that the fluid does not escape and does not cling to the wall of the pipe 11. In fact, it is possible to use the device 10 solely for the purpose of stripping the exterior of the pipe to clean it of foreign matter.

When used in ultrasonic detection where the fluid in the chamber 52 is not pressurized, it is possible to omit the openings 40 and 50 that provide communication between the chamber 52 and the interiors of the seals. The natural resilience of the elastomeric material of the seals 24 and 25 will be sufficient to keep the sealing contact with the periphery of the pipe where the fluid in the chamber 52 is not under pressure. For greater assurance of the maintenance of a positive seal with the pipe exterior under some conditions, the spaces 39 and 51 within the seals 24 and 25 may be pressurized by a separate pressure source, or many be permanently charged with a fluid under pressure. Generally, a relatively low pressure within these spaces will be sufficient.

If desired, the pipe 11 may be lubricated on its exterior surface before passing through the chamber 52 to minimize the frictional resistance of the seals 24 and 25. This may be accomplished simply by assuring that there is oil in the upper portion of the well through which the pipe 11 passes, so that the pipe's surface includes the lubricating film. Also, beneath the lower seal 25 and above the flange 16, there may be provided an inlet fitting 54 to permit a lubricating fluid to be admitted to the inside of the cylindrical member 14 but exteriorly of the chamber 52. This bathes the pipe in the lubricating fluid immediately prior to its contact with the lower seal 25.

When the unit 10 is used for ultrasonic inspection of the pipe 11, a transducer 55 will be included in the cylindrical member 14, suitably positioned to be below the level of the liquid introduced into the chamber 52. The transducer 55 connects through electrical conductors 56 to an auxiliary unit 57 constituting a signal generator and read-out means. During the ultrasonic inspection, there will be relative rotation between the pipe 11 and the unit 10. For example, the drive 13 may incorporate a means to rotate the pipe 11, while the unit 10 remains angularly fixed through its connection to the flange 12. Alternatively, the unit 10 may be given the rotational movement. Either continuous rotation or oscillation will permit the necessary scanning action. The seal for the chamber 52 will hold and conserve the liquid in the chamber so that it will always be present as the transfer medium during the period of the ultrasonic inspection.

The foregoing detailed description is to be clearly understood as given by way of illustration and example only, the spirit and scope of this invention being limited solely by the appended claims.

I claim:

1. A device for applying fluid to the periphery of a tubular member comprising
    a substantially cylindrical member,
    a duality of seal assemblies located one at either end of said cylindrical member,
        each of said seal assemblies including an annular elastomeric sheet member having opposite ends,
            said ends of said sheet member lying alongside and in engagement with the inner circumferential surface of said cylindrical member,
                each of said ends of said sheet member being provided with a bead thereon,
            a split annular member extending between said ends of said sheet member and complementarily engaging said circumferential surface of said cylindrical member,
                said split annular member being recessed for receiving said beads and holding said ends of said sheet member adjacent said circumferential surface,
                said sheet member intermediate said ends thereof being spaced from said split annular member
                    and inclined from either end inwardly toward the axis thereof to a throat portion of relatively small diameter,
            each of said sheet members having aperture means through the wall thereof to provide communication between the interiors of said sheet members and the portion of said cylindrical member intermediate said throat portions of said sheet members,
        a radial shoulder means at either end of each of said sheet members exteriorly thereof for retaining said seal assemblies against axial movement relative to said cylindrical member, and
    means for introducing a pressurized fluid into said portion of said cylindrical member intermediate said throat portions of said sheet members.

2. A device as recited in claim 1 in which each of said sheet members inclines toward said throat portion more gradually from the inner end thereof adjacent the other one of said sheet members than the inclination thereof at the outer end thereof.

3. A device for applying fluid to the exterior of a tubular member comprising
    a substantially cylindrical member adapted to receive a tubular member therein in a spaced relationship therewith,
    a duality of annular sealing members,
        said annular sealing members being disposed in the interior of said cylindrical member adjacent the opposite ends thereof,
        each of said sealing members including a flexible wall convergent inwardly from either end thereof to a throat portion of substantially smaller diameter than that of said cylindrical member,
            each of said sealing members having a hollow interior portion permitting deflection of said sealing members upon changes in diameter of a tubular member extending therethrough,
            each of said sealing members having an opening therethrough providing communication between the hollow interior thereof and the interior of said cylindrical member intermediate the throats of said sealing members, and
    means for introducing fluid into the interior of said cylindrical member intermediate said throats of said sealing members.

4. A device for applying fluid to the periphery of a tubular member comprising
    a substantially cylindrical member, and
    at least one sealing means,
        said sealing means including an annular elastomeric member having a first end adjacent one end of said cylindrical member and a second end spaced from said first end and located inwardly of said one end of said cylindrical member, and
        means for holding said ends of said elastomeric member adjacent the inner periphery of said cylindrical member,
            said means for holding said ends including a split annular sleeve,
                said elastomeric member having doubled-over end portions provided with beads thereon,
                said split annular sleeve having recesses for receiving said beads,
                said split annular sleeve lying alongside the circumferential inner surface of said cylindrical member,
            said elastomeric member converging inwardly from said ends to a throat portion of substantially smaller diameter than the diameters of said ends for engaging the periphery of a tubular member extending therethrough,
            said elastomeric member inwardly of said ends thereof being spaced from said cylindrical member to provide a hollow interior, whereby said sealing means is deflectable upon changes in diameter of said tubular member extending therethrough.

5. A device for applying fluid to the periphery of a tubular member comprising
    a substantially cylindrical member, and
    a duality of sealing means,
        said sealing means including a first annular elastomeric member having a first end adjacent one end of said cylindrical member and a second end spaced from said first end and located inwardly of said one end of said cylindrical member,
        a second annular elastomeric member having a first end adjacent the opposite end of said cylindrical member and a second end spaced from said first end and located inwardly of said opposite end of said cylindrical member, and
    means for holding said ends of said elastomeric members adjacent the inner periphery of said cylindrical member, said elastomeric members converging inwardly from said ends to throat portions of substantially smaller diameter than the diameters of said ends for engaging the periphery of a tubular member extending therethrough, said elastomeric members inwardly of said ends thereof being spaced from said cylindrical member to provide a hollow interior, whereby said sealing means are deflectable upon changes in diameter of said tubular member extending therethrough, each of said sealing means including an opening through the wall thereof inwardly of the throat portion thereof, whereby the interiors of said elastomeric members communicate with the interior of said cylindrical member intermediate said throats of said sealing means.

6. A device as recited in claim 5 including in addition means for introducing a pressurized fluid into said interior of said cylindrical member intermediate said throats of said sealing means, and means for detecting a change in pressure of said fluid, whereby loss of pressure through the wall of a tubular member in said cylindrical member can be observed.

References Cited

UNITED STATES PATENTS 2,303,090 11/1942 Pranger et al. _____ 277—34 X
3,224,254 12/1965 Loving _____ 73—67.8 X LOUIS R. PRINCE, *Primary Examiner.*

DAVID SCHONBERG, *Examiner.*

JEFFREY NOLTON, *Assistant Examiner.*